(12) United States Patent
White

(10) Patent No.: US 7,467,166 B2
(45) Date of Patent: *Dec. 16, 2008

(54) SYSTEM AND METHOD FOR HETEROGENEOUS CACHING

(75) Inventor: Seth White, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/697,671

(22) Filed: Apr. 6, 2007

(65) Prior Publication Data

US 2007/0192334 A1  Aug. 16, 2007

Related U.S. Application Data

(63) Continuation of application No. 11/178,633, filed on Jul. 11, 2005, which is a continuation of application No. 10/340,067, filed on Jan. 10, 2003, now Pat. No. 6,978,278.

(60) Provisional application No. 60/349,577, filed on Jan. 18, 2002.

(51) Int. Cl.
  *G06F 12/00* (2006.01)
  *G06F 7/00* (2006.01)
  *G06F 17/00* (2006.01)
  *G06F 17/30* (2006.01)
  *G06F 13/28* (2006.01)
  *G06F 13/00* (2006.01)

(52) U.S. Cl. .................... 707/203; 707/104.1; 711/118; 711/133

(58) Field of Classification Search ................. 709/203; 719/310, 315; 717/121; 726/4, 8; 711/133
See application file for complete search history.

(56) References Cited

U.S. PATENT DOCUMENTS

| | | | |
|---|---|---|---|
| 5,613,060 | A | 3/1997 | Britton et al. |
| 5,634,052 | A | 5/1997 | Morris |
| 5,765,171 | A | 6/1998 | Gehani et al. |
| 5,813,017 | A | 9/1998 | Morris |
| 5,909,689 | A | 6/1999 | Van Ryzin |
| 6,065,046 | A | 5/2000 | Feinberg et al. |
| 6,173,293 | B1 | 1/2001 | Thekkath et al. |
| 6,256,634 | B1 | 7/2001 | Moshaiov et al. |

(Continued)

OTHER PUBLICATIONS

Gamma, Erich, et al., "Design Patterns Elements of Reusable Object-Oriented Software," Addison-Wesley Publishing Company, pp. 293-303 (1998).
Enterprise JavaBeans Specification Version 2.0, Sun Microsystems, Aug. 14, 2001, 2 pages.

*Primary Examiner*—Christian P. Chace
*Assistant Examiner*—Vei-Chung Liang
(74) *Attorney, Agent, or Firm*—Fliesler Meyer LLP

(57) ABSTRACT

The caching of heterogeneous sets of bean is accomplished using a single cache. The beans can be identified by generating a unique identifier that is a combination of the bean's primary key and a self-reference identifier of the bean manager associated with that bean. The average size of a bean set associated with a bean manager can be specified such that the cache allocates memory for that set based on the average size. A callback interface can also be used to shift knowledge of a bean life cycle back to the bean manager.

16 Claims, 3 Drawing Sheets

U.S. PATENT DOCUMENTS

| | | | |
|---|---|---|---|
| 6,266,742 B1 * | 7/2001 | Challenger et al. | 711/133 |
| 6,304,321 B1 | 10/2001 | Sobeski et al. | |
| 6,304,879 B1 | 10/2001 | Sobeski et al. | |
| 6,366,930 B1 | 4/2002 | Parker et al. | |
| 6,401,239 B1 | 6/2002 | Miron | |
| 6,405,219 B2 | 6/2002 | Saether et al. | |
| 6,430,564 B1 | 8/2002 | Judge et al. | |
| 6,453,321 B1 | 9/2002 | Hill et al. | |
| 6,513,040 B1 | 1/2003 | Becker et al. | |
| 6,526,521 B1 | 2/2003 | Lim | |
| 6,567,809 B2 | 5/2003 | Santosuosso | |
| 6,578,160 B1 | 6/2003 | MacHardy et al. | |
| 6,591,272 B1 | 7/2003 | Williams | |
| 6,609,213 B1 | 8/2003 | Nguyen et al. | |
| 6,651,140 B1 | 11/2003 | Kumar | |
| 6,675,261 B2 | 1/2004 | Shandony | |
| 6,711,579 B2 | 3/2004 | Balakrishnan | |
| 6,757,708 B1 * | 6/2004 | Craig et al. | 709/203 |
| 6,826,601 B2 | 11/2004 | Jacobs et al. | |
| 6,836,889 B1 * | 12/2004 | Chan et al. | 719/310 |
| 6,842,758 B1 | 1/2005 | Bogrett | |
| 6,918,013 B2 | 7/2005 | Jacobs et al. | |
| 7,000,019 B2 | 2/2006 | Low et al. | |
| 7,003,776 B2 | 2/2006 | Sutherland | |
| 7,020,684 B2 | 3/2006 | White et al. | |
| 7,028,030 B2 | 4/2006 | Jacobs et al. | |
| 7,065,616 B2 | 6/2006 | Gajjar et al. | |
| 7,085,834 B2 | 8/2006 | Delany et al. | |
| 7,089,584 B1 | 8/2006 | Sharma | |
| 7,130,885 B2 | 10/2006 | Chandra et al. | |
| 7,136,879 B2 | 11/2006 | White | |
| 7,188,145 B2 | 3/2007 | Lowery et al. | |
| 7,240,101 B2 | 7/2007 | Rich et al. | |
| 2002/0004850 A1 | 1/2002 | Sudarshan et al. | |
| 2002/0073188 A1 | 6/2002 | Rawson | |
| 2002/0107934 A1 | 8/2002 | Lowery et al. | |
| 2003/0014480 A1 | 1/2003 | Pullara et al. | |
| 2003/0018732 A1 | 1/2003 | Jacobs et al. | |
| 2003/0041135 A1 | 2/2003 | Keyes et al. | |
| 2003/0065826 A1 * | 4/2003 | Skufca et al. | 709/315 |
| 2003/0074580 A1 * | 4/2003 | Knouse et al. | 713/201 |
| 2003/0105837 A1 | 6/2003 | Kamen et al. | |
| 2003/0110467 A1 | 6/2003 | Balakrishnan | |
| 2003/0115366 A1 | 6/2003 | Robinson | |
| 2004/0230747 A1 * | 11/2004 | Ims et al. | 711/133 |
| 2006/0143239 A1 | 6/2006 | Battat et al. | |

* cited by examiner

SYSTEM AND METHOD FOR HETEROGENEOUS CACHING

CLAIM OF PRIORITY

This Application is a Continuation of U.S. patent application Ser. No. 11/178,633, entitled "System and Method for Heterogeneous Caching" filed Jul. 11, 2005, pending, which is a Continuation of U.S. patent application Ser. No. 10/340,067 entitled "System and Method for Heterogeneous Caching" filed Jan. 10, 2003, now U.S. Pat. No. 6,978,278, issued Dec. 20, 2005, which claims priority of U.S. Provisional Application No. 60/349,577 entitled "System and Method for Heterogeneous Caching" filed Jan. 18, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following U.S. patent documents are assigned to BEA Systems, Inc., the assignee of the present application, and these documents are hereby incorporated herein by reference:

(A) U.S. Patent Application filed Jan. 10, 2003, application Ser. No. 10/340,301 to Seth White et al. and entitled, "System and Method for Read-Only Bean Caching"; now U.S. Pat. No. 7,136,879, issued Nov. 14, 2006, and (B) U.S. Patent Application filed Jan. 10, 2003, application Ser. No. 10/340,023, to Seth White et al. and entitled, "System and Method for Optimistic Caching", now U.S. Pat. No. 7,020,684, issued Mar. 28, 2006.

FIELD OF THE INVENTION

The invention relates to the caching of data and data objects.

BACKGROUND

Many systems that use entity beans to hold instances of data for an application will generate a separate cache for each entity bean. It is then necessary to configure each of these caches. Utilizing separate caches can lead to problems with memory fragmentation. Further, users can set limits on the size of these individual caches such that the system may be unable to use all available memory. For example, one of the entity beans might be very busy and require a lot of memory, while other beans sit idle. If the caches are configured to accommodate the busiest bean, the unused beans will have large cache allocations that will not be utilized, thereby wasting memory.

BRIEF SUMMARY

Systems and methods in accordance with embodiments of the present invention can utilize key identifiers to differentiate beans associated with different bean managers that might have a common primary key. In the system a bean, such as an entity bean or a session bean, can be associated with data and have a primary key. A system can utilize a cache for caching the bean. A bean manager can be associated with the bean and the cache. The bean manager can have a self-reference identifier. A key identifier can be generated to identify the bean in the cache. The key identifier can be made up of a combination of the primary key and the self-reference identifier.

Systems and methods in accordance with embodiments of the present invention can handle a first bean manager that is associated with beans of a first size on average, as well as a second bean manager that is associated with beans of a second size on average. A cache associated with the bean managers can cache both sizes of beans, allocating cache memory for each type of bean based on the average size of that type of bean.

Other systems and methods in accordance with embodiments of the present inventions can shift all knowledge of the life cycle of a bean from the cache to the bean manager. A bean holding a data instance can be cached in a system cache. A bean manager associated with the bean can manage the life cycle of the bean. A callback interface associated with the cache can allow the cache to make callbacks on the bean manager that are related to the bean, such as callbacks involving notification events, for example.

Other features, aspects and objects of the invention can be obtained from a review of the specification, the figures, and the claims.

DETAILED DESCRIPTION

Systems and methods in accordance with one embodiment of the present invention utilize a common cache to cache beans. One example allows a J2EE application to share a single runtime cache for multiple bean deployments. Allowing beans to share a cache can reduce the amount of allocated, but unused, system memory. Such a cache can be managed using a common resource algorithm. In one embodiment, a common resource algorithm allows a user to manage cache by allocating the whole cache to a single bean or by allocating cache based on the demand of individual beans. This approach can allow for a more intelligent management of memory.

As used herein the terms JAVA, JAVA BEAN, ENTERPRISE JAVABEAN, and J2EE are trademarks of Sun Mircrosystems, Inc.

One problem to be overcome in introducing such a shared cache involved the need to uniquely identify beans in the cache. In a homogeneous set of beans, or a set of beans that all refer to a single data table, for example, the primary key of each bean can be used as an identifier. When a heterogeneous set is used, which may contain beans representing data in multiple data tables or databases, there can be beans in the cache that have a common primary key. In a simple example, the first item in table A and the first item in table B might each have a primary key value of "1"

In order to allow for heterogeneous sets, but still utilize primary keys as identifiers, embodiments in accordance with the present invention can attach an additional object or identifier to the primary key that is put into the cache. Other approaches are possible, such as creating different caches for each data source so there will be no overlap of primary keys.

Figure 1:
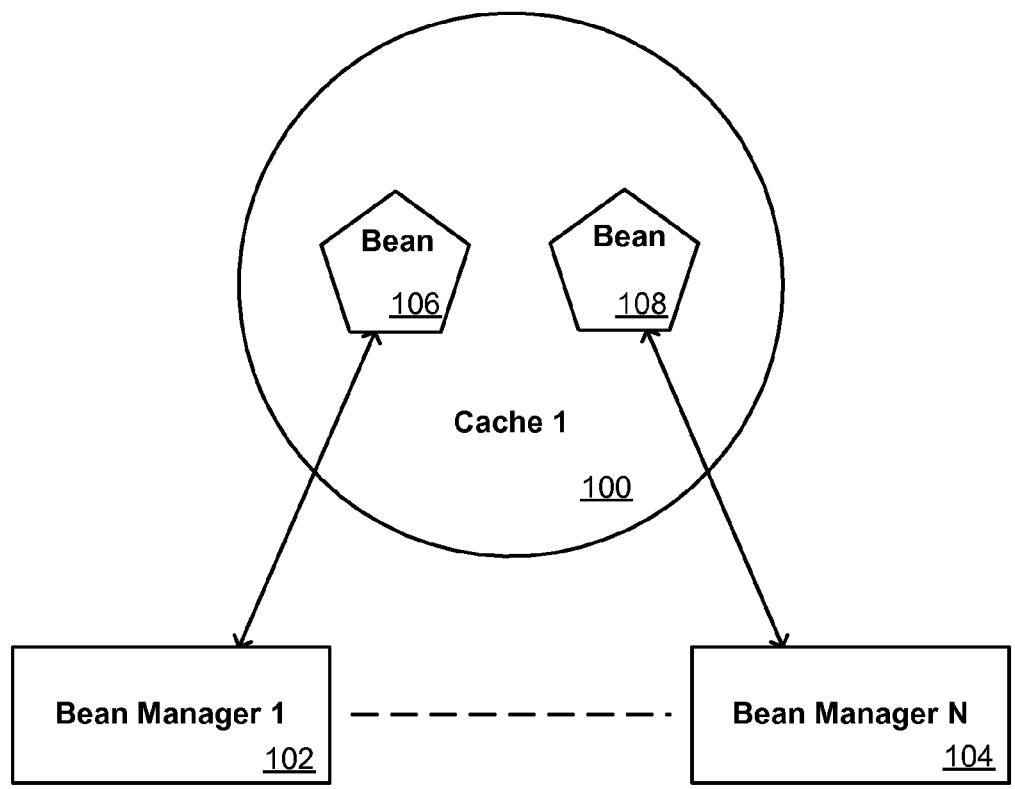
FIG. 1 is a diagram of a system in accordance with one embodiment of the present invention.

For a given cache, beans can be included that are associated with different bean managers. As shown in FIG. 1, cache 1 100 is associated with bean manager 1 102 and bean manager N 104. The cache 1 100 manages the caching of the bean manager objects, which in turn manage the life cycle of the beans. Managing the life cycle can include tasks such as creating, removing, loading, and storing the beans. In FIG. 1, bean manager 1 102 is using cache 1 100 to cache its beans, such as bean 106. There can be any number of bean managers associated with a cache. Cache 1 100 can hold the physical instances of each type of bean in its own internal data structure.

In response to life cycle events, each bean manager can make service requests on the cache. For instance, a bean manager can inform the cache ahead of time if, for example, the bean manager creates a new bean. Before the bean manager can put something into the cache, however, the bean manager has to provide the cache with a key that uniquely identifies that bean in the cache. In one embodiment, the bean manager includes a self-reference in the key. For instance, if bean manager 1 102 has a bean 106 with primary key "1" and bean manager N 104 has a bean 108 with primary key "1" bean manager 1 102 could cache the bean with a new primary key of "1102" and bean manager N 104 could cache the bean with a new primary key of "1104" In this way, each bean retains its primary key value of "1" and maintains its unique identity by including a reference to the appropriate bean manager. The new key can be, for example, a JAVA class that encapsulates the primary key of the bean plus a new object that refers to the bean manger. The cache can use this new key to make callbacks on the appropriate bean managers.

Figure 2:
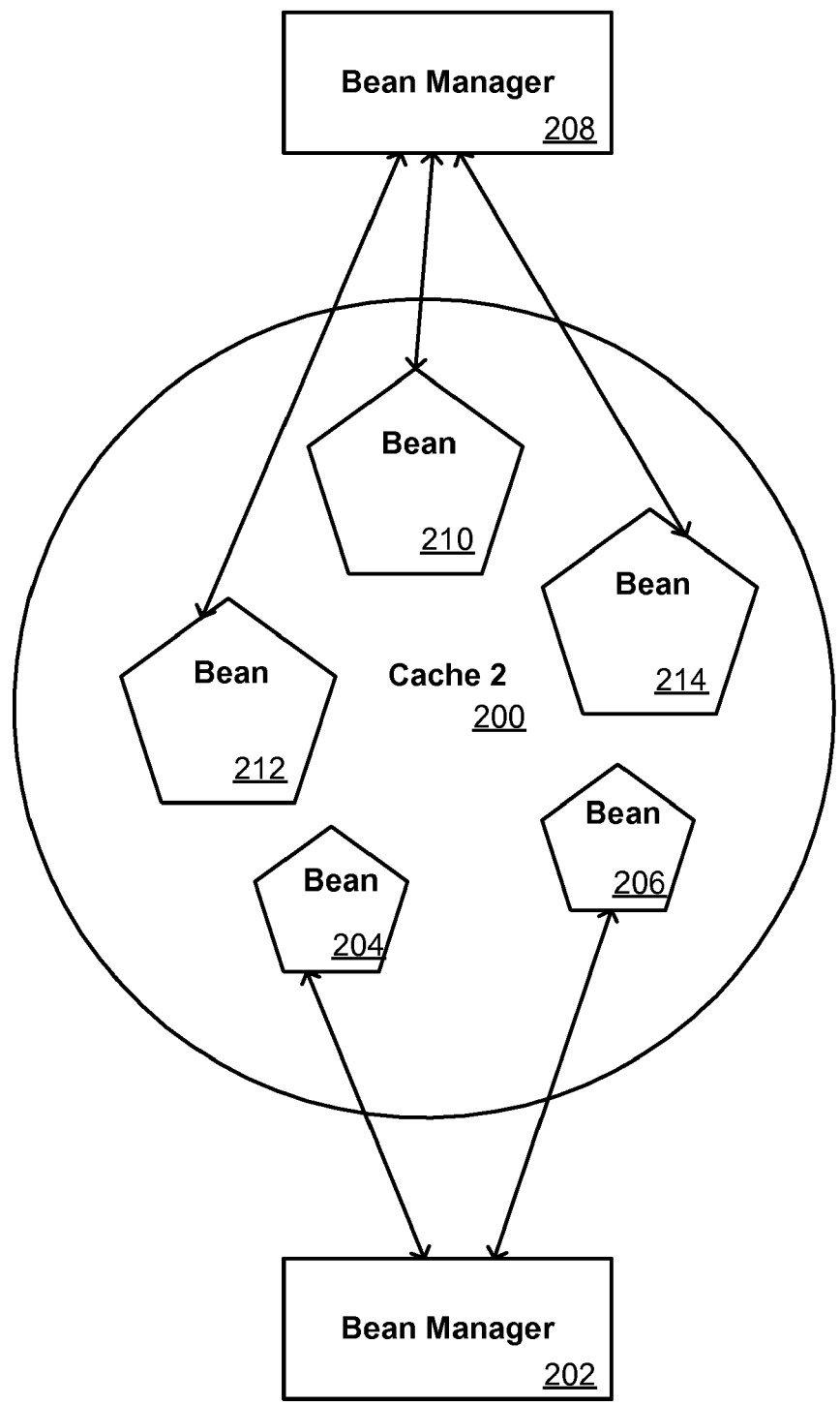
FIG. 2 is a diagram of a system in accordance with another embodiment of the present invention.

The ways in which resource limits can be specified for the cache are also an improvement over current systems. Presently, a user specifies a maximum number of beans in a cache. In accordance with one embodiment of the present invention, as shown in FIG. 2, a user can specify that beans have an average size for a particular bean manager. For example, the beans 204 and 206 stored in, cache 2 200 for bean manager 202 have the same average size, and the beans 210, 212, and 214 for bean manager 208 have the same average size, which is larger than the average size for bean manager 202. The cache 2 200 can then manage beans according to the relative average size for each bean manager. This allows the cache to manage beans more intelligently, as beans from different bean managers can have drastically different sizes and requirements. For instance, one bean might represent customer data and another bean might represent order information.

Figure 3:
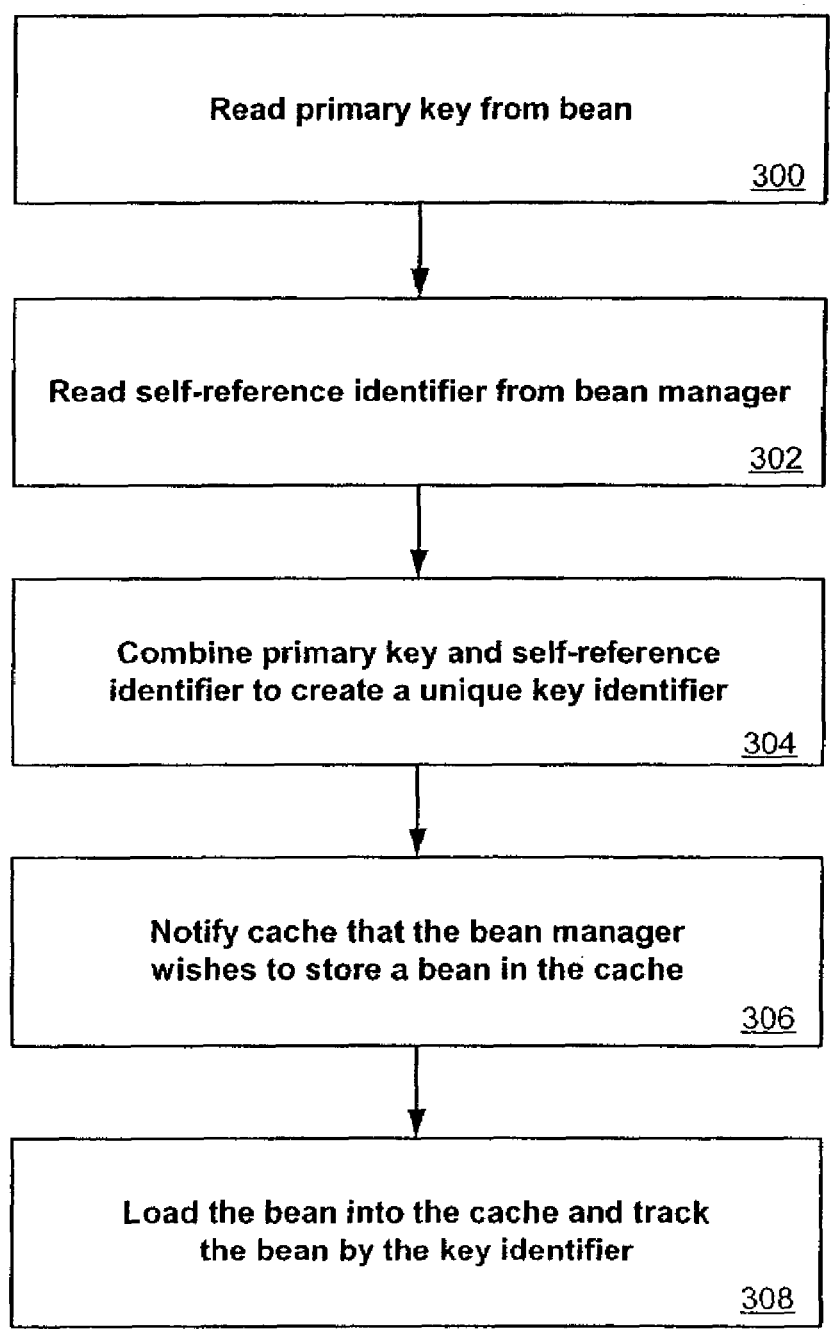
FIG. 3 is a flowchart showing the steps of a method in accordance with the embodiment of the FIG. 1.

FIG. 3 shows a method for caching a bean by key identifier. First, the primary key associated with a bean is determined 300. Then, the self-reference identifier of the associated bean manager is read 302. The primary key and self-reference identifier are then combined to form a unique key identifier 304. The bean manager notifies the caches that a bean is to be cached that corresponds to that key identifier 306. The bean is then loaded into the cache, which tracks the bean by the key identifier 308.

Many systems require a cache to have some knowledge of the life-cycle of a bean so the cache can call the life cycle methods on the beans themselves. This is difficult if the cache has to manage different types of beans. In accordance with one embodiment of the present invention, a cache can use a callback interface to make callbacks on a bean manager. A callback interface can be an event-driven method that points the cache in the proper direction for a bean without a bean having to have any knowledge of what exists outside the cache. Here, the bean manager can retain all bean-specific knowledge and information. The cache can simply inform the bean manager that something needs to be done, and does not have to worry about the life cycle of a bean.

For example, a prior art system would call methods on a bean that are defined by the EJB specification before the cache could evict a bean, as the bean might be keeping a cache state or open resource to other things. In one embodiment in accordance with the present invention, the cache can simply give a notification event to the bean manager saying that a bean is about to be evicted and the bean manager can worry about whether something needs to be done before the bean is evicted.

To configure application level cache, a user can make an entry in an application level deployment descriptor. A deployment descriptor is a file that indicates to an EJB server which classes make up the bean implementation and interfaces, as well as how EJBs interact if there is more than one EJB in a package. Certain elements can be used in an application level deployment descriptor to support heterogeneous entity bean caching. For example, a deployment descriptor, such as an XML file, can include the root element containing the name of the descriptor.

Another element that can be included is an "ejb" element that is specific to the EJB modules of the application. An "entity cache" element can be used to define a named application level cache that caches entity ejb instances at runtime. Individual entity beans can specify the cache that they want to use through the name of the cache. There may be no restriction on the number of entity beans that reference an individual cache.

Other elements can include, for example, an element specifying a unique name for an entity bean cache, the name being unique within an .ear (enterprise archive) file. An element specifying the maximum number of beans in the cache can be included, such as "max-beans-in-cache", which specifies a limit on the size of an entity bean cache in terms of memory size, such as may be expressed in bytes or megabytes. An EJB container can attempt to estimate the amount of memory used by each entity bean in the cache, and limit the number of beans in the cache based on these estimates. Alternatively, a user can provide such estimates. An element can also be included that specifies the maximum cache size.

Another element that can be used is a "read-timeout-seconds" or equivalent element. Such an element can specify the number of seconds between load (e.g., "ejbLoad") calls on a Read-Only entity bean. If read-timeout-seconds is set to zero, ejbLoad may only be called when the bean is brought into the cache.

A "concurrency-strategy" or similar element can be used to specify how a container should manage concurrent access to an entity bean. Concurrency-strategy can have, for example, values of "exclusive", "database", and "read-only". "Exclusive" can refer to an exclusive locking scheme. "Database" can refer to a scheme in which a separate entity bean instance is allocated for each transaction, while the locking and caching is handled by the database. "Read-only" can be used to specify read-only entity beans.

Certain other elements can be used, such as in a .jar (Java archive) file, to configure an entity bean to use application-level cache. These elements can include, for example, entity-cache-name, estimated-bean-size, max-beans-in-cache, idle-timeout-seconds, read-timeout-seconds, and concurrency-strategy. The estimated-bean-size element can be used if a developer wants to override the container's estimate of the average bean size.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for providing heterogeneous data caching for transactions involving entity beans of different sizes in an application server, said method comprising the steps of:
    reading a plurality of data item instances that are contained in a database and are required by a transaction;
    holding in a single system cache the data item instances of different sizes by entity beans of corresponding different sizes, read-only type, write-only type, read-and-write type, and combination of types thereof;
    associating a plurality of bean managers with the single system cache, each entity bean in the cache associated with one of said bean managers, wherein each said bean manager manages the life cycle tasks including creating, removing, loading, and storing of the entity beans that are associated with the bean manager;
    allocating memory dynamically based on the demand of each entity bean;
    associating a time-out value with each said entity bean in the cache wherein said time-out value determines how long the said entity bean should hold an instance of a data item before updating to a new version of said data item; and
    associating an entity bean identifier with each said entity bean in the cache wherein said entity bean identifier comprising an entity bean primary key and an additional object or identifier, and wherein said entity bean identifier associated with each entity bean is unique to its associated entity bean in the cache;
    wherein said heterogeneous data caching causes storage of information in memory and enables an intelligent management of memory.

2. The method of claim 1 further comprising:
    acquiring a new instance of said data item by said entity bean after the entity bean has been in existence for a period of time equal to said time-out value.

3. The method of claim 2 wherein said entity bean acquires said new instance of said data item by either reading from a database or reading from another entity bean in said cache.

4. The method of claim 2 wherein said new instance of said data item is a newer version of the data item that has been updated during said period of time.

5. The method of claim 1 wherein said time-out value is specified by an element in a deployment descriptor.

6. The method of claim 1 further comprising:
    reaching a time-out period by the entity bean wherein said time-out period is specified by an expiration of a period of time equal to said time-out value;
    determining, by said entity bean, whether a second entity bean in the cache contains a more recent copy of said data item than said entity bean; and
    updating said entity bean by reading the data item from said second entity bean if said second entity bean contains a more recent copy, otherwise updating said entity bean by reading from a database.

7. The method of claim 1 wherein said time-out value specifies the number of seconds between entity bean's load method calls by a read-only entity bean.

8. The method of claim 5 wherein a time-out value of zero indicates that the entity bean's load method is called only when the entity bean is brought into the cache.

9. A computer implemented system for providing heterogeneous data caching for transactions involving entity beans of different sizes, said system comprising:
    a database containing a plurality of data items accessed by one or more transactions;
    a single system cache that includes a plurality of entity beans of different sizes, read-only type, write-only type, read-and-write type, and combination of types thereof wherein each said entity bean stores a copy of a data item for use by said transactions and associates with one of a plurality of bean manager, and wherein each said bean manager manages the life cycle tasks including creating, removing, loading, and storing of the entity beans that are associated with the bean manager;
    a common resource algorithm associated with said cache that dynamically allocate memory based on the demand of each said entity bean;
    a time-out value associated with each said entity bean wherein said time-out value specifies a period of time that said entity bean should hold the copy of the data item before updating to a new version of said data item; and
    an entity bean identifier associated with each said entity bean within said cache wherein said entity bean identifier comprising an entity bean primary key and an additional object or identifier, and wherein said entity bean identifier associated with each entity bean is unique to its associated entity bean within said cache;
    wherein said heterogeneous data caching causes storage of information in memory and enables an intelligent management of memory.

10. The system of claim 9 wherein said entity bean acquires a new instance of said data item after the entity bean has been in existence for the period of time equal to said time-out value.

11. The system of claim 10 wherein said entity bean acquires said new instance of said data item by either reading from a database or reading from another entity bean in said cache.

12. The system of claim 10 wherein said new instance of said data item is a newer version of the data item that has been updated during said period of time.

13. The system of claim 9 wherein said time-out value is specified by an element in a deployment descriptor.

14. The system of claim 9 wherein said entity bean is configured to:
    reach a time-out period wherein said time-out period is specified by a configurable expiration of a period of time equal to said time-out value;
    determine whether a second entity bean in the cache contains a more recent copy of said data item than said entity bean; and
    update its copy of the data item by reading from said second entity bean if said second entity bean contains a more recent copy, otherwise update its copy of the data item by reading from a database.

15. The system of claim 9 wherein said time-out value specifies the number of seconds between entity bean's load method calls by a read-only entity bean.

16. The system of claim 13 wherein a time-out value of zero indicates that the entity bean's load method is called only when the entity bean is brought into the cache.

* * * * *

UNITED STATES PATENT AND TRADEMARK OFFICE
CERTIFICATE OF CORRECTION

PATENT NO. : 7,467,166 B2  Page 1 of 1
APPLICATION NO. : 11/697671
DATED : December 16, 2008
INVENTOR(S) : White It is certified that error appears in the above-identified patent and that said Letters Patent is hereby corrected as shown below:

In column 2, line 63, after ""1"" insert -- . --.

In column 6, line 16, in claim 9, delete "manager," and insert -- managers, --, therefor.

In column 6, line 21, in claim 9, delete "allocate" and insert -- allocates --, therefor.

Signed and Sealed this

First Day of June, 2010

David J. Kappos
*Director of the United States Patent and Trademark Office*